United States Patent Office 3,200,172
Patented Aug. 10, 1965

3,200,172
MOULDING COMPOSITIONS COMPRISING EPOXIDIZED NOVOLAK, NOVOLAK AND AMINE
Alfred Renner, Basel, Switzerland, assignor to Ciba Limited, Basel, Switzerland
No Drawing. Filed Nov. 18, 1959, Ser. No. 853,692
Claims priority, application Switzerland, Dec. 18, 1958, 67,477
5 Claims. (Cl. 260—831)

The present invention provides hardenable moulding compositions containing (a) A polyglycidyl ether of a phenol-formaldehyde condensation product obtained by condensation under acid conditions, (b) A phenol-formaldehyde condensation product obtained by condensation under acid conditions, and (c) A nitrogen base as hardening accelerator.

The polyglycidyl ethers (a) are obtained in the usual manner by reaction of an epihalohydrin or dihaloydrin in an alkaline medium with a novolak obtained by condensing phenol with formaldehyde under acid conditions. These polyglycidyl ethers are advantageously made from novolaks prepared by condensing under acid conditions 1 molecular proportion of phenol with more than 0.8 molecular proportion, and advantageously about 1 molecular proportion, of formaldehyde, the novolak being completely free from any unreacted phenol.

These novolaks, which are preferably used as starting materials, are made in the usual manner by condensing 1 molecular proportion of phenol, if desired in the form of an aqueous solution, with more than 0.8 molecular proportion of formaldehyde, preferably in the form of an aqueous solution of 30 to 37% strength thereof (formalin), in the presence of an acid condensing agent such as hydrochloric or oxalic acid; the resulting reaction product is freed completely from any unreacted phenol, advantageously by being subjected to a steam distillation.

In making the polyglycidyl ethers (a) it is of advantage to use 2 to 5 molecular proportions of epichlorohydrin for every hydroxyl equivalent of the novolak used; any unreacted epichlorohydrin can be recovered. In general, it is not necessary to use more than 5 equivalents of epichlorohydrin.

When fewer than 2 equivalents of epichlorohydrin for every phenolic hydroxyl equivalent are used, there is in certain cases a risk of cross-linked, insoluble products being formed.

As phenol-formaldehyde condensation products (b), which are used as the second constituent of the moulding compositions according to the present invention, the same novolaks are suitable as are used as starting materials in the manufacture of the polyglycidyl ethers (a). It is of advantage to select novolaks in which the molecular ratio of formaldehyde: phenol is slightly lower than in the novolaks used for the preparation of the constituent (a). Thus, it is of advantage to use, for example, a mixture of a novolak in which the molecular ratio formaldehyde: phenol is 0.8, and of a polyglycidyl ether of a novolak in which the molecular ratio formaldehyde: phenol is approximately 1.

As examples of the nitrogen base (c) forming the hardening accelerator in the compositions of this invention there may be mentioned: Triethanolamine, triethylenetetramine, dimethylamino-propylamine, tris-dimethylaminophenol, dimethylbenzylamine, phenylhydrazine, pyridine and above all hexamethylenetetramine. The hardening of the moulding compositions of the present invention at an elevated temperature and under superatmospheric pressure gives rise to a cross-linking reaction between the phenol-novolak polyglycidyl ether (a) and the phenol-novolak (b) with free, unsubstituted phenolic hydroxyl groups. This cross-linking reaction is accelerated by the presence of the nitrogen base.

When the accelerator used is a nitrogen base that is solid at room temperature, such as hexamethylenetetramine, it is of advantage with a view to ensuring good storing properties of the resulting moulding composition to use its 3 constituents in the form of separate particles. The phase mixing at an elevated temperature and under superatmospheric pressure then takes place only during the moulding operation and causes spontaneous hardening.

When the accelerator used is a nitrogen base that is liquid at room temperature, such as dimethylaminopropylamine, pyridine or the like, it is of advantage to dissolve it in the melted novolak constituent. This melt is then allowed to solidify and is disintegrated and mixed with the likewise disintegrated polyglycidyl ether so that the two constituents are present as separate particles. This procedure ensures the separation of the base from the polyglycidyl ether in the moulding composition as well as its good storing properties.

In making the moulding compositions ready for use, the resin constituents can be mixed with one or several, preferably pulverulent, fillers such as asbestos, chalk powder, mica, koalin, quartz powder, metal powder, metal oxides or rock meals. Apart from such fillers there may also be incorporated dyestuffs, stabilisers, plasticisers, lubricants and other modifying substances.

The synthetic resin compositions are prepared by the known methods, advantageously by simply mixing together the constituents in a suitable mixing apparatus, for example in a ball mill. If desired, the moulding compositions of this invention can be shaped as lozenges, tablets or granules to make it easier to introduce them into the moulds.

Unless otherwise indicated, parts and percentages in the following examples are by weight.

*Example 1*

A phenol-novolak polyglycidyl ether (resin A) was prepared in the following manner:

836 parts of a 9:1 mixture of phenol and water (containing 8 molecular proportions of phenol), 793 parts of aqueous formaldehyde solution of 30.3% strength (8 molecular proportions of $CH_2O$) and 8 parts of N-hydrochloric acid are brought to the boil with stirring and reflux cooling. When the exothermic reaction has subsided and a white turbidity has appeared, another 32 parts of N-hydrochloric acid are added, and the whole is condensed for 2 hours at the boil. The reaction mixture is neutralized with 40 parts of N-sodium hydroxide solution, twice washed with water at 65° C., and subjected to steam distillation until the distillate runs practically free from phenol. (Test: No turbidity appears after saturation with sodium chloride.)

The novolak obtained in this manner is dissolved in 2220 parts of epichlorohydrin (24 molecular proportions) and separated from the aqueous layer. The resin solution is then treated with 122 parts of ethylene glycol monomethyl ether. While stirring the mixture vigorously and cooling it externally, there are then added 131.5 parts of aqueous sodium hydroxide solution of 48% strength and then 250 parts of solid, finely powdered sodium hydroxide (of 96.8% strength) in small portions in such a manner that the temperature remains constant at 60° C. The reaction mixture is treated with 440 parts of benzene and dehydrated by azeotropic distillation under reduced pressure. The pressure is always adjusted so as to maintain a constant temperature of 50° C.; in the initial stages this requires a pressure of about 200 mm. Hg which is reduced to 120 mm. in the course of the azeotropic distillation. 300 parts of water separate out.

The reaction mixture is neutralized with 3 parts of glacial acetic acid, and the finely crystalline precipitate of sodium chloride is filtered off. The benzene and the excess epichlorohydrin are distilled off at first under atmospheric pressure and towards the end under a pressure of 60 mm. Hg, and the resin is heated in vacuo to 150° C. and maintained for 1 hour at the same temperature.

On cooling the reaction mixture there are obtained 1100 parts of a pale-brown, clear solid resin which has a softening point of 65° C. (measured on a Kofler heater) and an epoxide content of 4.63 molecular proportions per kg.

A phenol-novolak (resin B) was prepared in the following manner:

1045 parts of phenol oil (aqueous solution of 90% strength), 793 parts of formaldehyde solution of 30.3% strength and 50 parts of N-hydrochloric acid are heated with stirring and reflux cooling until an exothermic reaction sets in. The mixture is condensed at the boil (100° C.) for 2 hours from the moment when the reaction mixture turns turbid. To neutralise the catalyst acid the mixture is then treated with 5 grams of sodium bicarbonate and cooled to 70° C. The aqueous phase is separated, and the resin phase is washed twice with 1000 parts by volume of hot water on each occasion, as much of the water as possible is removed by decantation, and the resin residue is distilled. When the resin has reached a temperature of 150° C., the pressure is reduced to 30 mm. Hg, and the resin is stirred for another 30 minutes at 150° C. under a pressure of 30 mm. Hg, and then allowed to cool on flat metal plates. Yield: 980 parts of novolak having a softening point of 86° C., measured on a Kofler heater.

A moulding composition is prepared from the resin components A and B described above, in the following manner:

247 parts of resin A and 114 parts of resin B are separately finely ground in a hammer mill, mixed with 3.7 parts of hexamethylenetetramine, 10.0 parts of glycerol monostearate and 625 parts of bolus alba (trademark: "Molochit") ground for 24 hours in a stoneware ball mill. The resulting powder is moulded in the cold state to form rods which are then converted into granules of 2–6 mm. mesh size. The moulding composition obtained in this manner is easy to work up, flows under a specific moulding pressure of as little as 20 kg. per sq. cm. and hardens rapidly under the action of heat and pressure. At room temperature (20–25° C.) and even at about 10° C. above room temperature this composition has a pot life of at least 6 months. Mouldings made therefrom are easy to remove from the hot mould and have an excellent appearance and lustre and outstanding dimensional stability.

Test rods (60 x 10 x 4 mm.) made from the above moulding composition at 165° C. possessed the following properties:

| Moulding time at 165° C. in minutes | Bending strength, kg./sq. cm. | Impact Bending, kg./cm. | Water absorption in percent | |
|---|---|---|---|---|
| | | | 24 hrs. at 20° C. | 10 mins. at 100° C. |
| 1 | 890 | 2.75 | 0.01 | 0.14 |
| 2 | 890 | 2.8 | 0.00 | 0.12 |
| 3 | 940 | 3.2 | 0.00 | 0.11 |
| 5 | 870 | 3.5 | 0.01 | 0.09 |
| 7 | 940 | 3.7 | 0.02 | 0.07 |

Moulding obtained by pressing for 3 minutes at 165° C. possessed the following properties:

Shrinkage in shape _____ 0.95%.
Modulus of elasticity _____ 1690 kg./sq. mm.
Heat stability according to Martens ___ 84° C.
Dielectric coefficient _____ 5.163.
Loss factor, $tg\delta$ at 50 c.p.s. and 20° C. _ 0.022.
Specific resistance (ohm/cm.) _____ $2.2 \times 10^{15}$.
Electric leakage resistance (VDE 0303) T5.

*Example 2*

125 parts of the phenol-novolak (resin B) described in Example 1 are melted and 5 parts of dimethylaminopropylamine are dissolved in the melt. A hard, meltable resin having a softening point of 100° C. is obtained which is then finely comminuted.

118 parts of this resin, 247 parts of the phenol-novolak polyglycidyl ether (resin A) described in Example 1, 10 parts of glycerol monostearate and 625 parts of kaolin are ground in a ball mill for 24 hours, to yield a moulding composition which has a good pot life, is easy to process and flows well. It can be stored, for example, for 24 hours at 50° C. without suffering any appreciable deterioration of its flow properties.

*Example 3*

20 parts of the phenol-novolak (resin B) described in Example 1, and 1.2 parts of dicyandiamide are melted together at 120° C. The resulting hard, meltable resin (softening point: 84° C.) is then finely comminuted.

15.9 parts of the above resin, 36.6 parts of the phenol-novolak polyglycidyl ether (resin A) described in Example 1, 2.25 parts of glycerol monostearate, 97.5 parts of kaolin and 3.0 parts of nigrosine are ground for 24 hours in a ball mill. The resulting moulding composition has a good pot life, hardens rapidly and flows well; it can, for example, be stored for 24 hours at 50° C. without suffering an appreciable deterioration of its flow properties.

Mouldings made from the above composition are easy to withdraw from the mould and are hard at the moulding temperature (165° C.); they have a good lustre and absorb 0.05% of water at 20° C. on immersion therein for 24 hours.

*Example 4*

25 parts of the phenol-novolak (resin B) described in Example 1 and 0.75 part of tris-[dimethylamino]-phenol are melted together for 30 minutes at 150° C. The resulting hard, meltable resin (softening point: 101° C.) is then finely comminuted.

15.9 parts of the above resin, 36.6 parts of the phenol-novolak polyglycidyl ether (resin A) described in Example 1, 2.25 parts of glycerol monostearate, 3.0 parts of nigrosine and 97.5 parts of calcined kaolin (trademark: "Molochit") are ground together in a ball mill for 24 hours. The moulding composition obtained in this manner has a good pot life, hardens very rapidly and flows well. It can be stored, for example, for 24 hours at 50° C. without suffering an appreciable deterioration of its flow properties.

Mouldings made from the above composition are hard at the moulding temperature (165° C.), have a handsome lustre and an electric leakage resistance (VDE) equal to T5.

*Example 5*

25 parts of the phenol-novolak (resin B) described in Example 1 and 3 parts of triethanolamine are melted together for 30 minutes at 120° C. The resulting hard, meltable resin (softening point: 87° C.) is then finely comminuted.

14.1 parts of the above resin, 31.4 parts of the phenol-novolak polyglycidyl ether (resin A) described in Example 1, 2.25 parts of glycerol monostearate and 103.5 parts of steatite are ground in a ball mill for 24 hours. A moulding composition is obtained which has a very good pot life, hardens rapidly and flows very well. It can be stored, for example, for 24 hours at 50° C. without suffering an appreciable deterioration of its flow properties.

Mouldings made from the above composition have a strong lustre and are hard at the moulding temperature (165° C.). On immersion for 24 hours in water at 20° C. they absorb 0.04% of water and have an electric leakage resistance (VDE) equal to T5.

What is claimed is:

1. A thermo-setting moulding composition containing
   (a) a solid polyglycidyl ether of a novolak obtained by condensing under acid conditions one molecular proportion of phenol with more than 0.8 molecular proportion and not exceeding about one molecular proportion of formaldehyde, said novolak being prepared solely from said reagents and completely freed from any unreacted phenol prior to its etherification,
   (b) a phenol-formaldehyde condensation product obtained by condensation under acid conditions, and
   (c) a nitrogen base as curing accelerator.

2. A moulding composition as claimed in claim 1, in which the resin constituent (a) is a polyglycidyl ether derived from a novolak which has been obtained by condensing under acid conditions 1 molecular proportion of phenol with approximately 1 molecular proportion of formaldehyde, said novolak being prepared solely from said reagents and completely freed from any unreacted phenol by steam distillation prior to its etherification, said composition further containing as resin constituent (b) a novolak obtained by condensing under acid conditions 1 molecular proportion of phenol with 0.8 molecular proportion of formaldehyde.

3. A moulding composition as claimed in claim 1, containing as curing accelerator (c) hexamethylenetetramine.

4. A moulding composition as claimed in claim 1, which contains the nitrogen base (c) in the form of a solution in the novolak constituent (b).

5. A stable, thermohardenable resin composition comprising a blend of (a) a novolak resin obtained by reacting under acid conditions phenol with formaldehyde, said novolak resin being substantially freed from any unreacted phenol; (b) an epoxide resin containing 1,2 epoxy groups obtained by etherification of novolak resin (a) with an epihalohydrin in alkaline medium; and (c) a small, catalytically effective amount of triethanolamine.

References Cited by the Examiner

UNITED STATES PATENTS

| | | | |
|---|---|---|---|
| 2,521,911 | 9/50 | Greenlee | 260—831 |
| 2,779,668 | 1/57 | Daniels et al. | 260—831 |
| 2,941,981 | 6/60 | Elbling et al. | 260—831 |
| 2,951,779 | 9/60 | Mackey et al. | 260—830 |

FOREIGN PATENTS 768,125   2/57   Great Britain.

MURRAY TILLMAN, *Primary Examiner.*

DONALD ARNOLD, LEON J. BERCOVITZ,
*Examiners.*